United States Patent Office 3,296,289
Patented Jan. 3, 1967

3,296,289
DIALKYL TIN BIS(CYCLOHEXYL MALEATE) COMPOUNDS
Carl R. Gloskey, Stirling, N.J., assignor to M & T Chemicals, Inc., New York, N.Y., a corporation of Delaware
No Drawing. Filed Dec. 31, 1962, Ser. No. 248,238
5 Claims. (Cl. 260—429.7)

This invention relates to novel organotin compounds and to novel stabilized halogen-containing polymer compositions.

Halogen-containing polymers, including homopolymers and copolymers of vinyl chloride and vinylidene chloride, are materials which have proven useful because of their desirable physical properties. Uses of these materials have been limited, however, by their inherent instability when exposed to conditions of heat and light. Under such conditions, the halogen-containing polymer may discolor, become brittle, crack, check or otherwise suffer deterioration of its physical properties. Thus, unstabilized chlorine-containing polymer compositions may be highly unsatisfactory for outdoor use where they may be subjected to both heat and light. Various techniques are known for stabilizing these polymers against degradation in the presence of heat alone or light alone but no single stabilizer compound has been found which confers the high degree of both heat and light stability which is required for outdoor use.

A further defect of prior art stabilizers is that they may normally be viscous liquids or pasty gels. They may thus be considerably more difficult to handle than solid stabilizers.

It is an object of this invention to provide novel organotin compounds which may be characterized by their unexpectedly superior physical properties. It is a further object of this invention to provide novel chlorine-containing polymer compositions characterized by their high resistance to degradation during outdoor exposure.

In accordance with certain of its aspects, this invention relates to novel organotin compounds

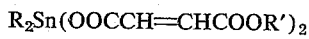

wherein R is lower alkyl and R' is cyclohexyl.

In accordance with this invention the novel organotin compounds may contain a radical R which may be a lower alkyl radical. Lower alkyl radicals may be alkyl radicals containing less than 10 carbon atoms. For example, R may be methyl, ethyl, n-propyl, isopropyl, n-butyl, sec-butyl, isobutyl, tert-butyl, n-amyl, isoamyl 2-amyl, 3-amyl, tert-amyl, neopentyl, 3-methyl-2-butyl, 2-methyl-1-butyl, hexyl, heptyl, octyl, nonyl, etc. Both of the R radicals need not be the same although preferably they may be. Preferred R radicals include butyl and octyl.

The group —OOCCH=CHOOR' which is present in the novel organotin compounds may be derived from a half-acid ester of maleic acid. The radical R' contained therein may preferably be a cyclohexyl radical. R' may also be a substituted cyclohexyl radical. Typical substituents which may be employed include alkyl cycloalkyl, aryl, alkenyl, alkynyl, hydroxyl, halogen, etc. Typical R' radicals falling within the scope of this invention include cyclohexyl; 2-methylcyclohexyl; 4-ethylcyclohexyl; 4-sec-butylcyclohexyl; 4-tert-butylcyclohexyl; 2-cyclohexylcyclohexyl; 4-cyclohexylcyclohexyl; 2-ethynylcylohexyl; 4-hydroxymethylcyclohexyl; 3 - amylcyclohexyl; 2,6 - dimethylcyclohexyl; 2,4,6-trimethylcyclohexyl; 4,4-dibutylcyclohexyl; etc.

Thus, the novel organotin compounds of this invention may typically include dibutyltin bis(cyclohexyl maleate), dioctyltin bis(cyclohexyl maleate), dibutyltin bis(2-methylcyclohexyl maleate), diamyltin bis(4-ethylcyclohexyl maleate), dibutyltin bis(4-methylcyclohexyl maleate), dibutyltin bis(2-cyclohexylcyclohexyl maleate), dibutyltin bis(4-cyclohexylcyclohexyl maleate), dihexyltin bis(4-cyclohexylcyclohexyl maleate), dibutyltin bis(2-ethynylcyclohexyl maleate), dibutyltin bis(4-hydroxymethylcyclohexyl maleate), dioctyl bis(4-hydroxymethylcyclohexyl maleate), dibutyltin bis(2-6-dimethylcyclohexyl maleate), dibutyltin bis(2,4,6-trimethylcyclohexyl maleate), dibutyltin bis(4-sec-butylcyclohexyl maleate), dioctyltin bis(4-tert-butylcyclohexyl maleate), etc.

These novel organotin compounds may typically be prepared from maleic acid or anhydride, the desired cyclohexanol, and the desired dialkyltin oxide. For example, 4-cyclohexylcyclohexanol may be reacted with maleic anhydride in an inert solvent, say benzene, by mixing the reactants in solution and refluxing. The solvent may then be evaporated and the half-acid ester recovered if desired, although isolation of the half-acid ester is not necessary. The half-acid ester may then be reacted with di-n-butyltin oxide in the presence of benzene, by azeotropically removing the water of reaction. Either step may also be carried out by heating the reactants together in the absence of a solvent or diluent. The typical product, di-n-butyltin bis(4-cyclohexylcyclohexyl maleate), may be recovered in substantially pure form and high yield.

It is a particular feature of this invention that many of the novel organotin compounds may be characterized by unexpectedly superior physical properties, including a relatively high and sharp melting point. Prior art diorganotin bis(half-acid ester maleates) may typically exist at room temperature as sticky pastes or highly viscous, oily liquids. Thus, they may be difficult to handle and may stick to blenders and other machines. The novel products of this invention may typically be dry, free-flowing powders having an apparently crystalline nature at room temperature and thus may greatly reduce handling and sticking problems.

It is a further particular feature of this invention that the novel organotin compounds may be employed as stabilizers for halogen-containing polymers.

Thus, in accordance with certain of its aspects, this invention relates to a process for preparing stabilized halogen-containing polymer compositions which comprises blending together a halogen-containing polymer and a stabilizing amount of a compound

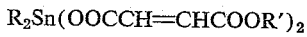

wherein R is lower alkyl and R' is cyclohexyl, including substituted cyclohexyl.

The halogen-containing polymers which may be stabilized in practice of this invention may typically be chlorine-containing polymers and preferably polymers of vinyl chloride or vinylidene chloride. They may be homopolymers, e.g., poly(vinyl chloride), poly(vinylidene chloride), etc. They may also be copolymers of vinyl chloride or vinylidene chloride with other ethylenically unsaturated comonomers. Ethylenically unsaturated comonomers are compounds which contain polymerizable carbon-to-carbon double bonds and may include acrylates, such as acrylic acid, ethyl acrylate, acrylonitrile, etc.; vinyls such as styrenes, vinyl acetate, etc.; maleates such as maleic acid, maleic anhydride, maleate esters; etc.

The preferred halogen-containing polymers may be poly(vinyl chloride) and vinyl chloride-vinyl acetate copolymers.

The novel organotin compounds which may be employed in the stabilization of halogen-containing polymers may be any of those hereinbefore described. The preferred compounds may be those wherein R is selected from the group consisting of butyl and octyl, i.e., the dibutyltin and dioctyltin compounds. Dibutyltin bis(cyclohexyl maleate) may be especially preferred.

The novel organotin compound may be blended with the halogen-containing polymer in a stabilizing amount. Typically, a stabilizing amount may be about 0.1–10 parts by weight per 100 parts of polymer. Preferred amounts of the organotin compound may be 1–5 parts, most preferably 2–4 parts, say 3 parts per 100 parts of polymer. The organotin stabilizer may be a single compound of the type noted or a mixture of two or more different compounds. It may also be possible to employ the novel compounds of this invention together with one or more prior art primary stabilizers for halogen-containing polymers.

The halogen-containing polymer and the novel organotin compounds may typically be blended together by Banbury blending, dry blending, milling or the like.

Practice of this invention may be observed from an inspection of the following illustrative examples wherein all parts are parts by weight unless otherwise noted.

EXAMPLE 1

This example illustrates the preparation of the novel compounds of this invention.

156.9 grams (1.6 moles) of maleic anhydride was mixed with 160.3 grams (1.6 moles) of cyclohexanol. The mixture was heated and stirred for one hour at 110–120° C. At the end of this time, it was cooled and 2 liters of benzene and 199.1 grams (0.8 mole) of di-n-butyltin oxide were added. A Dean-Stark trap was fitted and the reaction mixture was refluxed for 1.5 hours, during which 14 grams (14.4 theory) of water was collected. The solution was cooled, filtered, and the solvent flash-stripped off to give 308 grams (70% yield) of product. A small amount of the product was recrystallized from pentane to give white crystals with a sharp melting point of 71–73° C. Analysis was

|  | Calculated for dibutyltin bis-(cyclohexyl maleate) | Found |
|---|---|---|
| Sn, percent | 18.92 | 18.93 |
| Acid No | 178.8 | 183.0 |
| Saponification No | 357.6 | 358.02 |

EXAMPLE 2

This example illustrates the preparation of diorganotin bis(cyclohexyl maleate) compounds wherein the cyclohexyl radical is a substituted cyclohexyl radical.

Dibutyltin bis(2-methylcyclohexyl maleate) was prepared in accordance with the procedure of Example 1 except that 2-methylcyclohexanol replaced cyclohexanol. Analysis of the product gave the following results:

|  | Calculated | Found |
|---|---|---|
| Sn, percent | 18.1 | 17.99 |
| Acid No | 171.0 | 184.0 |

EXAMPLE 3

This example illustrates the unexpected superiority of the compounds of this invention in outdoor weathering tests.

Test sheets for outdoor weathering tests were prepared by blending together 100 parts of poly(vinyl chloride) and 3.0 parts of the noted stabilizer. The polymer employed was the poly(vinyl chloride) having a specific gravity of 1.40, a Shore durometer "D" hardness of 80 and an ultimate tensile strength of 7000 pounds per sq. in., sold under the trademark Geon 103–EP. The compositions were thoroughly blended by milling for 5 minutes on a two-roller differential mill oil-heated to 325–350° F. A continuous band about 1 millimeter thick formed around one of the rollers. This band was cut and the sheet removed from the mill and cut into 10 cm. x 10 cm. squares for testing.

The test sheets were placed in racks and continuously exposed to outdoor weathering in Arizona at 45° southern exposure. At one-month intervals, 1.25 cm. x 1.25 cm. squares were cut from the test sheet to form a permanent record of the results. After 5 months exposure, each of the test sheets had been exposed to 84,542 langleys (one langley equals one gram-calorie per square centimeter) and 938 ultraviolet sun hours. The sheets were examined and rated as in Table I.

*Table I*

| Stabilizer | Remarks |
|---|---|
| Dibutyltin bis(lauryl maleate) (standard). | Sheet turns brittle, slight discoloration. |
| Dibutyltin bis(isooctyl maleate) (standard). | Checked sheet, moderate discoloration. |
| Dibutyltin bis(benzyl maleate) (standard). | Brittle sheet, black color. |
| Dibutyltin bis(cyclohexyl maleate) (this invention). | Sheet still flexible, little discoloration. |

As may be seen from Table I, halogen-containing polymers stabilized in accordance with this invention are characterized by their unexpectedly improved resistance to degradation during outdoor weathering. Similar results may be observed when other novel organotin compounds of this invention are substituted for dibutyltin bis(cyclohexyl maleate).

As many embodiments of this invention may be made without departing from the spirit and scope thereof, it is to be understood that the invention includes all such modifications as come within the scope of the appended claims.

I claim:

1. An organotin compound $$R_2Sn(OOCCH\!\!=\!\!CHCOOR')_2$$

wherein R is lower alkyl and R' is cyclohexyl.

2. An organotin compound as claimed in claim 1 wherein R is selected from the group consisting of butyl and octyl.
3. Dibutyltin bis(cyclohexyl maleate).
4. Dibutyltin bis(2-cyclohexylcyclohexyl maleate).
5. Dibutyltin bis(4-cyclohexylcyclohexyl maleate).

References Cited by the Examiner

UNITED STATES PATENTS

| 2,826,597 | 3/1958 | Gloskey | 260—429.7 |
| 2,857,413 | 10/1958 | Weinberg | 260—429.7 |
| 3,004,000 | 10/1961 | Kauder et al. | 260—45.75 |
| 3,067,167 | 12/1962 | Lynn et al. | 260—45.75 |
| 3,095,434 | 6/1963 | Stamm | 260—429.7 |

FOREIGN PATENTS

| 9,147 | 10/1959 | Japan. |
| 345,340 | 5/1960 | Switzerland. |

TOBIAS E. LEVOW, *Primary Examiner.*

E. C. BARTLETT, F. R. OWENS, W. F. W. BELLAMY,
*Assistant Examiners.*